ELECTRONIC APPARATUS FOR READING SYMBOLS

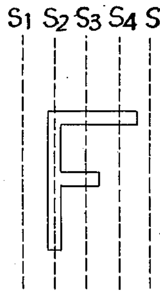
Fig. 1.
Fig. 2.
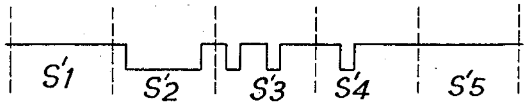
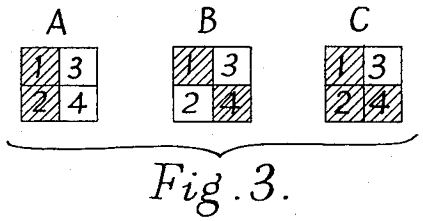
Fig. 3.
Fig. 4.
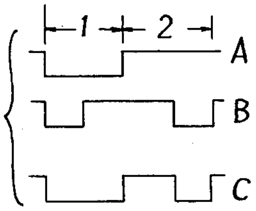
Fig. 8. Fig. 9. Fig. 11.
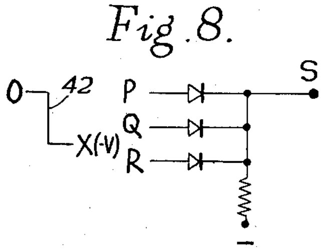
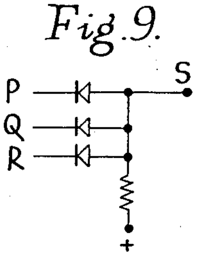
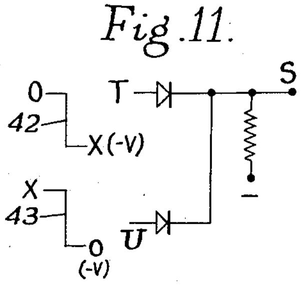
Fig. 10.
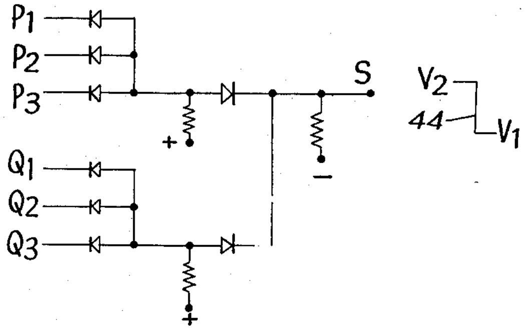
Fig. 12.
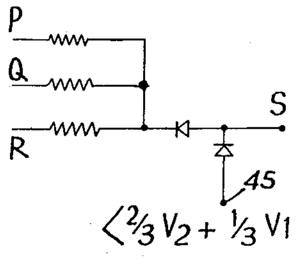
INVENTORS
Christopher E. G. Bailey
George O. Norrie
BY
Ralph B. Stewart
ATTORNEY Nov. 20, 1962 C. E. G. BAILEY ET AL 3,065,457

Filed March 25, 1957 5 Sheets-Sheet 2

INVENTORS
Christopher E. G. Bailey
George O. Norrie
BY
Ralph B. Stewart
ATTORNEY INVENTORS
Christopher E. G. Bailey
George O. Norrie
BY
Ralph B. Stewart
ATTORNEY Nov. 20, 1962 C. E. G. BAILEY ET AL 3,065,457

ELECTRONIC APPARATUS FOR READING SYMBOLS

Filed March 25, 1957 5 Sheets-Sheet 4

INVENTORS
Christopher E. G. Bailey
George O. Norris
BY
Ralph B. Stewart
ATTORNEY Nov. 20, 1962 C. E. G. BAILEY ET AL 3,065,457

ELECTRONIC APPARATUS FOR READING SYMBOLS

Filed March 25, 1957

5 Sheets-Sheet 5

INVENTORS
Christopher E. G. Bailey
George O. Norrie
BY
Ralph B. Stewart
ATTORNEY United States Patent Office 3,065,457

Patented Nov. 20, 1962

3,065,457

ELECTRONIC APPARATUS FOR READING SYMBOLS

Christopher Edmund Gervase Bailey, London, and George Ogilvie Norrie, Capel, England, assignors to The Solartron Electronic Group Limited, Surrey County, England Filed Mar. 25, 1957, Ser. No. 648,236
Claims priority, application Great Britain Mar. 29, 1956
8 Claims. (Cl. 340—146.3)

Figure 5:
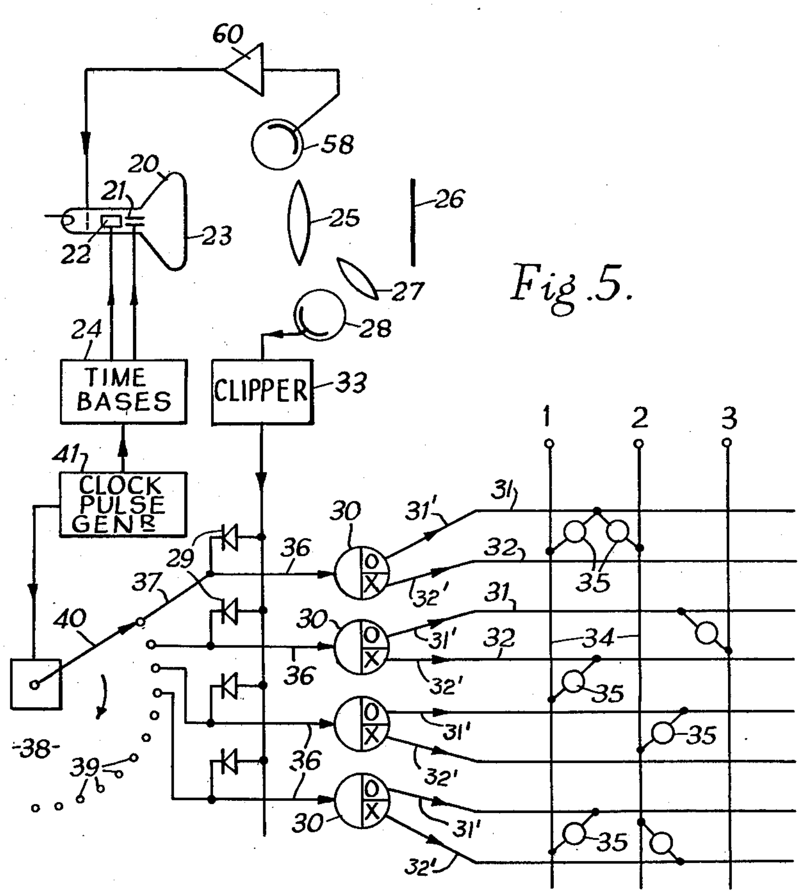

The present invention relates to electronic apparatus for reading symbols, such for example as numerals or letters of the alphabet in print or typescript.

Typewritten and printed characters, though nominally of the same fount of type, are liable to many defects of multilation and displacement. This invention has for one of its objects to provide symbol-reading apparatus which is particularly well adapted to operate with such imperfect symbols as occur in practice. Another object is to provide symbol-reading apparatus which is particularly well adapted to operate with a limited range of different symbols and which is less complex than known apparatus. The invention is not, however, limited to cases where the number of different symbols is relatively small.

According to the present invention, apparatus for reading symbols comprises means for deriving from a symbol a signal combination characteristic of the symbol and including a plurality of signal elements, different symbols being characterised by different signal combinations, a plurality of output conductors, one for each different symbol to be read, forming one co-ordinate set of a matrix, a plurality of binary storage devices, one for each said signal element, having outputs connected to leads forming the other co-ordinate set of the matrix, the leads of which other set are connected by logical elements to the conductors of the said one co-ordinate set of the matrix, and means for applying the said signal elements to set the storage devices respectively, the arrangement being such that a predetermined voltage condition is established in accordance with the settings of the storage devices only upon that one of the output conductors corresponding to the symbol scanned.

The means for deriving the characteristic signal combination may comprise means for scanning the symbol, thereby generating signal elements which are distributed in time.

The characteristic signals may be "video" signals produced by the traversals of a scanning light spot over parts of the symbol or an image thereof, or they may be of other form such for example as the differential of the "video" signals, or the signals produced by scanning with a double spot and using coincidence networks as described in a paper entitled "The Flying-Spot Microscope" by F. Roberts and J. Z. Young, read at a Convention of The Institution of Electrical Engineers on "The British Contribution to Television" held from April 28 to May 3, 1952.

Alternatively, if the symbols are printed in magnetic ink, the characteristic signals may be signals from one or from a plurality of magnetic sensing heads moved relatively to the paper.

When a plurality of heads is used, they may convey their output signals to the storage devices simultaneously, or in a succession determined by an electronic switching arrangement.

It has been found, however, that a usual defect of characters, especially of typewritten duplicated characters, is a hazy edge which consists, on close examination, of a number of "black" spots more or less densely packed near the nominal boundary of the impression; another usual defect consists of areas of white inside each boundary. We prefer, therefore, to recognise average black or average white over small defined areas of each character, and moveover to differentiate against the defects mentioned by means of integrating, clipping, pulse-width discrimination and other known electronic processing methods or combinations of these, applied to the signals before their passage to the binary storage devices.

The binary storage devices may be electronic triggers, ferrite cores, capacitor storage devices, or storage devices such as those described in U.S. National Bureau of Standards Report No. 2362, March 1953, or other suitable random-access devices.

The logical elements may take the form of diodes, combinations of diodes, ferrite cores or other devices which are well known. Examples of such logical elements are what are known as "and" and "or" gates.

The number of such logical elements required is not high; there does not need to be one at every matrix intersection. In order to distinguish N different symbols the number of logical elements required is between N and $\log_2 N$. We find it highly desirable to add elements in considerable excess of those strictly necessary, to overcome errors from mutilated or displaced characters or from spurious marks on the paper. When apparatus according to co-pending patent application Ser. No. 648,235, filed March 25, 1957, is used, only a residual displacement remains at the scanner. In such cases we have found that the figures 0 to 9 in conventional typefounts may be discriminated by a matrix of 10 x 10 elements. If such apparatus is not used, a matrix of 16 x 16 elements or more is desirable.

The signals may be applied to the inputs of all the storage devices in parallel, these devices being activated in succession to render each capable of storing the signal applied thereto at the instant of activation. The successive activation may be effected by means of a shift register of known type. This comprises a series of bistable devices having clock pulses applied simultaneously to all, the devices being interconnected in cascade in such a manner that each device, when a clock pulse occurs, assumes the state previously held by the preceding device in the cascade. Alternatively, the successive activation may be effected by sets of cascaded binary counters and coincidence gates to achieve the same end.

Figure 7:
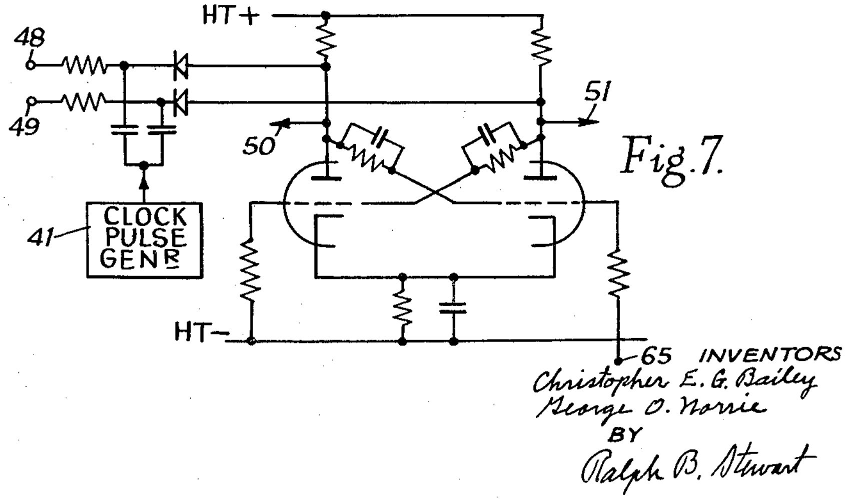
Figure 6:
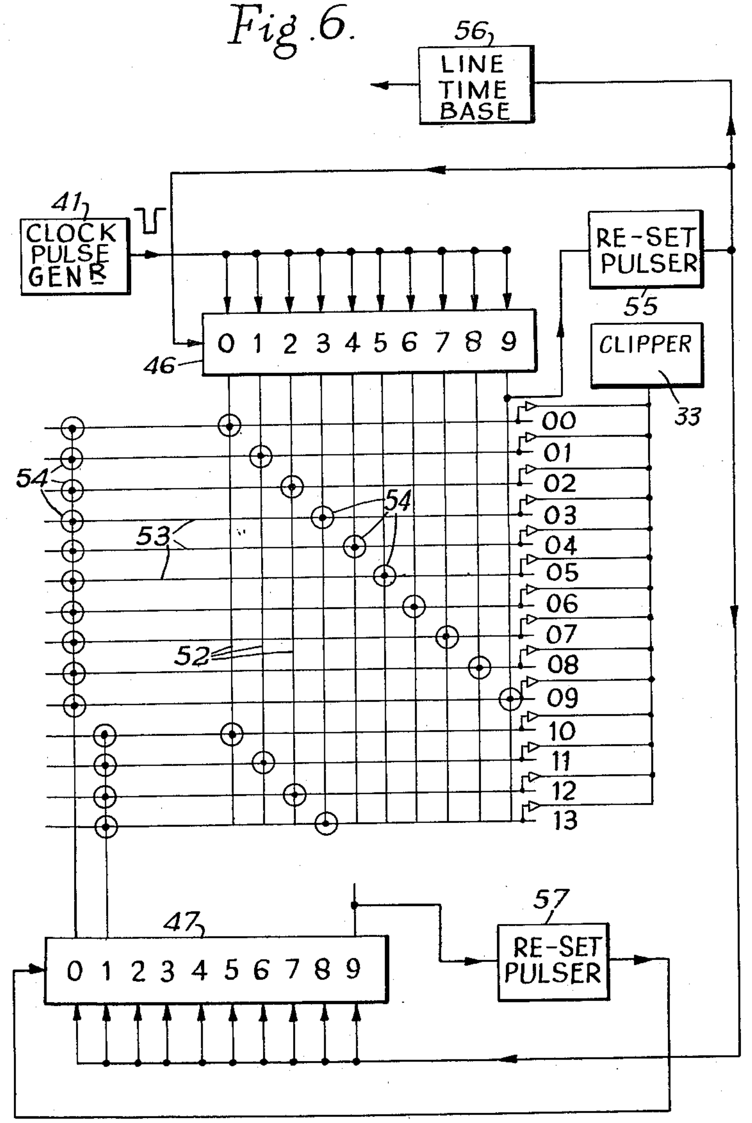
Figure 13:
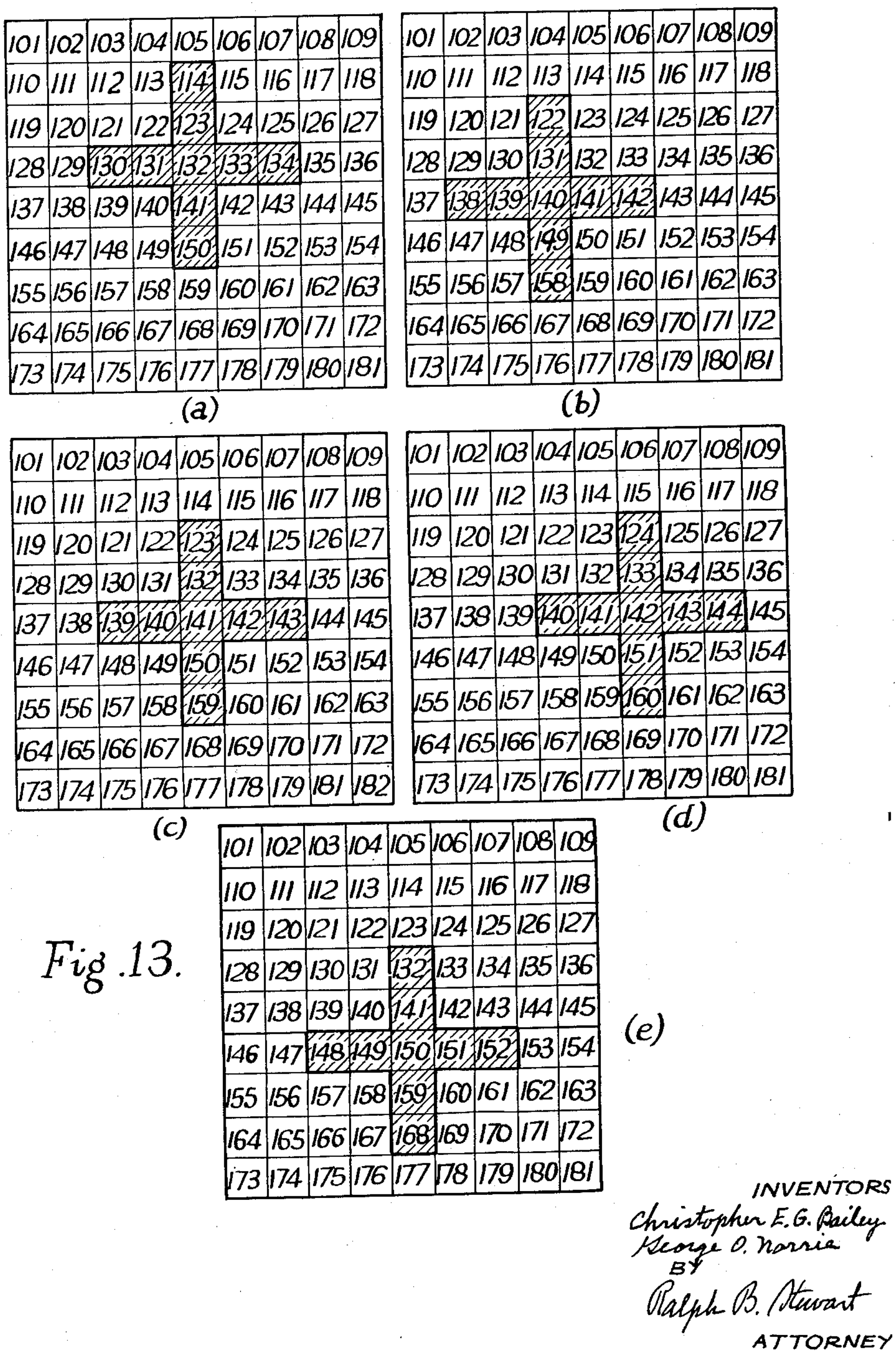
Figure 14:
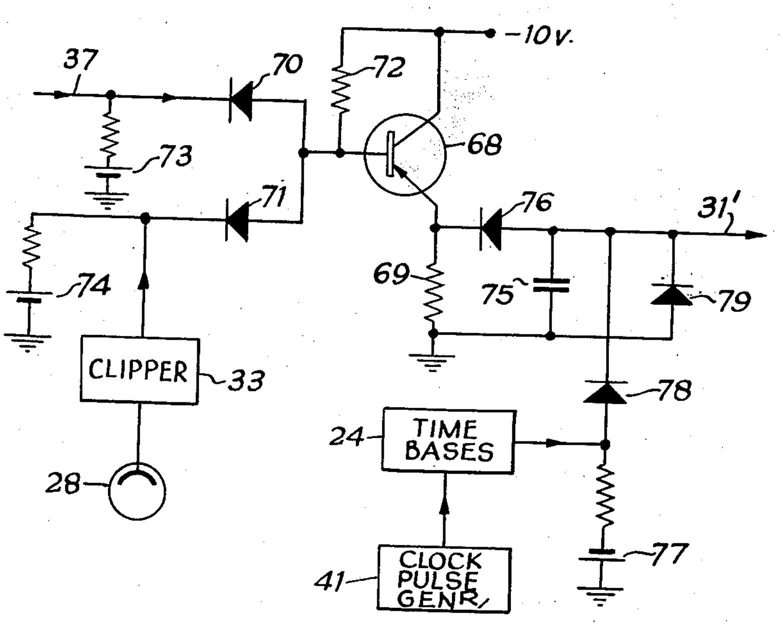

The invention will be described, by way of example, with reference to the accompanying drawings, in which FIG. 1 is a diagram illustrating one way of scanning a symbol, FIG. 2 shows the signal waveform produced by the scanning in FIG. 1 and characteristic of the symbol in FIG. 1, FIG. 3 shows three simplified symbols, FIG. 4 shows signals characteristic of the three symbols in FIG. 3, FIG. 5 is a part of a circuit diagram of one embodiment of the invention, FIG. 6 shows a part of a shift register system that may be used as a switch in FIG. 5, FIG. 7 is a circuit diagram of one element of a shift register in FIG. 6, FIGS. 8 to 12 show some of the forms that the logical elements may take, FIG. 13 is an explanatory diagram showing how certain errors in centering can be overcome using the present invention, and FIG. 14 is a circuit diagram showing how a binary storage device in the form of a capacitor may be used in the invention.

Referring to FIG. 1, the symbol shown is the capital letter F and is shown as scanned along five vertical lines marked $S_1$ to $S_5$ by a suitable scanner as in FIG. 5. Assuming that the letter is black on a white background and that a negative voltage step is obtained in the scanner at each passage from white to black, the signal waveform of the scanner has the character shown in FIG. 2. This signal is characteristic of the letter F and is produced by no other capital letter of the alphabet.

Turning now to FIG. 5, there is shown a cathode ray tube 20 serving as a flying spot scanner having line and frame deflecting means 21 and 22 whereby a spot of light may be deflected in a raster over the end wall 23 of the tube by time bases 24. An image of this raster is formed by a lens system, represented diagrammatically by the lens 25 upon a symbol on a paper sheet 26. Light reflected or scattered from the paper 26 is collected by a lens system represented by 27 upon a photoelectric cell or photo-multiplier tube 28. The signal generated by cell 28 at any instant will depend upon the average brightness of the elementary area being scanned at that time, that is, by the average symbol density of the elementary area.

In the example to be described with reference to FIGS. 1, 2 and 5, each symbol is scanned in five vertical lines and provision is made for ten significant conditions to be represented in each line.

Signals from the cell 28 are applied through a clipper 33 which limits the amplitude in both senses to remove noise, and through separate diodes 29, in parallel to the inputs 36 of a series of bi-stable storage devices 30. Each of these devices has two states, which will be referred to as the *o* and *x* states, the *o* state resulting in the application of a negative potential on an output lead 31' and the *x* state resulting in the application of a negative potential on an output lead 32'. In the example being described there are one hundred of the storage devices 30 although only four of these are shown in FIG. 5. It is assumed that the apparatus is required to deal with symbols corresponding to the numerals 0 to 9 so that only ten different symbols have to be identified. Each symbol is allotted a separate output terminal of which only three, namely those of 1, 2 and 3, are shown.

The leads 31' and 32', of which there are two hundred, are connected to parallel conductors 31 and 32 which form one co-ordinate conductor set of a matrix of which the other co-ordinate set is constituted by leads 34 from the ten output terminals 1, 2, 3 etc. The matrix conductors 31 and 32 on the one hand and 34 on the other hand are connected together by logical elements symbolically represented by circles 35. The way in which these elements are constituted will be discussed later but it may here be noted that only one of the two conductors 31 and 32 from any one storage device 30 is connected by a logical element to any particular one of the conductors.

The storage devices 30 are of known type such that when a negative-going pulse is applied from a lead 37 to the input terminal 36 the device assumes a state *o* or *x* dependent upon the voltage applied at that instant by the photo-cell 28 to the diode 29. It will be assumed that a "black" signal from the photo-cell causes that one of the storage devices 30 which has a negative pulse applied thereto from 37 to assume its *x* state. Operation of storage devices 30 will depend upon the average symbol density of the elementary area being scanned, and the average density must be above a certain datum value determined by the constants of the storage devices and other circuit elements.

A mechanical switch-distributor 38 is shown for applying a negative voltage to the leads 37 in succession, although in practice an electronic switch is used. Such electronic switch is described later in this specification, where it is also made apparent why devices 30 are only set to the *x* state when negative pulses are applied thereto from both the switch 38 and the clipper 33. The switch 38 of FIGURE 5 has one hundred contacts 39, of which only some are shown, and the switch arm 40 is rotated under the control of a clock pulse generator 41, which also controls the time bases 24, at such a rate that ten of the contacts 39 are traversed for each line on the symbol scanned.

Referring again to FIGS. 1 and 2, the effect of the signals in FIG. 2 from the photo-cell 28 of FIG. 5 upon the storage devices 30 will be considered, it being understood that the symbol of FIG. 1 is scanned by the scanner of FIG. 5 in only five vertical lines $S_1$ to $S_5$. Because of the smaller number of line scans in FIG. 1, it will be assumed that there are only fifty of the storage devices 30. These correspond to the rectangular array of fifty elementary areas made up of five lines each of ten elementary areas. During the first line scan $S_1$ (FIG. 1) no black signal is transmitted since the scanning beam does not traverse any part of the symbol F, and the first ten storage devices 30 are thus left in their *o* states. Thus there is no signal in the period $S'_1$ of FIG. 2. During the second scanning line $S_2$ the beam traverses the vertical part of the symbol F extending from, say, the second to the ninth of the ten parts into which the scanning line is, in effect, directed. This produces a negative pulse in the period $S'_2$ of FIG. 2 extending over the second to the ninth sections of the period. The eleventh and twentieth devices 30 will, therefore, be left in their *o* state while the twelfth to the nineteenth devices 30 will be in their *x* state. The twentieth and twenty-first devices 30 will be in their *o* state, the twenty-second and twenty-fifth devices 30 will be in their *x* state, while the twenty-third, twenty-fourth and the twenty-sixth to the thirtieth will be in their *o* state, and so on.

It is seen, therefore, that at the conclusion of one scan of a symbol, the storage devices 30 have been set to correspond with the signals derived by scanning, the settings being characteristic of that particular symbol. The signal waveform in FIG. 2 which is characteristic of the letter F is a combination of five signal sections, namely the sections $S'_1$ to $S'_5$ respectively. Each section is made up of ten elementary signal elements representing the light values of the ten elementary areas in a corresponding scanning line of FIGURE 1. The fact that in FIG. 2 two of the signal sections, namely $S'_1$ and $S'_5$ are alike, is not material since it is not only the nature of the elementary signal elements in each section but also their relative positions in the section which are material. The relative positions of the voltage pulses representing "black" and "white" in FIG. 2 determine the conditions of the individual storage devices 30 in FIG. 5. Other symbols will be distinguished from F by a characteristic signal which differs from that shown in FIG. 2 in respect of the relative positions of the signal elements. At the conclusion of the reading process of each character a reset pulse is applied to all storage devices 30 to annul the signal stored on them. This reset pulse may be derived from the frame fly-back of the time base generator 24.

The requirements of the logical elements 35 will be better understood from a consideration of the much simplified symbols in FIG. 3 which are designated A, B, and C. The three symbols can be distinguished from one another in a number of ways. One way would be to define the condition of each of the four squares of each symbol area, thereby deriving signals of the character shown in FIG. 4 at A, B and C corresponding to scanning of the symbols A, B and C respectively along two vertical scans, the first scan traversing squares 1 and 2 and the second traversing squares 3 and 4. For many purposes, however, this is unnecessarily elaborate. For instance the symbols can be more simply distinguished by the fact that in the bottom row black occurs at 2 but not at 4 for A, at 4 but not at 2 for B, and at 2 and 4 for C. The logical elements can be chosen to perform this selective operation.

Examples of logical elements are shown in FIGS. 8 to 12. The element in FIG. 8 is in the form of an "and" gate and is such that if a voltage step O to —V, the upper level O obtaining when a storage device is in the *o* state and the lower level —V when the storage device is in the $x$ state as shown at 42, is applied simultaneously to all the terminals P, Q and R from leads 31, the voltage output generated at S is equal to —V, but if any of the terminals P, Q or R are held at zero, the application of the voltage step 42 to the other or others does not modify the voltage at S.

The element in FIG. 9 is in the form of an "or" gate and is such that if the voltage step 42 is applied to any one of the terminals P, Q or R, the output at S is equal to —V.

A more complex element is shown in FIG. 10. In this case if the voltage step 42 is applied to $P_1$ or $P_2$ or $P_3$ and to $Q_1$ or $Q_2$ or $Q_3$, the output at S is equal to $x$.

The circuit of FIG. 11 is physically the same as that of FIG. 8 except that there are only two inputs instead of three. If however the terminals T and U are connected to leads 31 and 32 respectively of two storage devices 30 the voltage levels will be as shown for the states $o$ and $x$ of the two devices respectively. Accordingly this circuit will only produce an output (negative excursion at terminal S) if the storage device connected to T is in the $x$ state and the storage device connected to U is in the $o$ state (that is to say, not $x$).

In FIG. 12 there is shown a voltage step 44 from $V_2$ to $V_1$ and a terminal 45 is clamped at a voltage less than $\frac{2}{3}V_2+\frac{1}{3}V_1$. In this case if the voltage step is applied to at least two of the three inputs P, Q and R, the output at S is below the clamping level.

Logical elements may be combined in a number of ways. For example, if the outputs of two "and" gates one having inputs of $x_1$ and $x_2$ and the other inputs of $x_1'$ and $y_1'$ are connected through an "or" gate, the output of the latter will correspond to ($x_1$ and $x_2$) or ($x_1'$ and $x_1'$.

FIG. 6 shows one form of electronic switch suitable to be used for the switch 38 in FIG. 5. This comprises two shift registers, namely a register 46 for units and a register 47 for tens. These registers are of known construction and each comprises a cascade of trigger circuits such as is shown in FIG. 7. Two input terminals are shown at 48 and 49 and two output terminals are shown at 50 and 51. The output terminals of one of the trigger circuits are connected to the input terminals respectively of the next circuit in the cascade. The clock pulses are applied from the generator 41 of FIG. 5 as shown. Re-set pulses are applied at a terminal 65.

As is seen from FIG. 6 the clock pulses are applied in parallel and in a negative-going sense to all the circuits of FIG. 7 in the units register 46. On the occurrence of each clock pulse, each of the trigger circuits assumes the state previously held by the preceding circuit. One of the output terminals of each trigger circuit is connected to a lead 52, the leads 52 being crossed by leads 53 constituting output leads and numbered 00, 01, 02, etc. These leads 53 constitute the leads 37 in FIG. 5 and there are, therefore, a hundred such in this example. Intersections between leads 52 and 53 are connected through diodes 54 represented by a dot surrounded by a circle. Thus the intersections between the lead 52 from 0 in the register 46 is connected through a diode to each of the leads 53 numbered 00, 10 and (not shown in the drawing) 20, 30 and so on. Similarly there are connections from 1 of the register 46 to 01, 11, 21, 31, etc. and so on for the remaining leads 52 from the register 46.

The state which is passed step by step through the register 46 is a negative state and when this reaches the end at 9 a pulse is applied to a re-set pulser 55 which passes a pulse back to 0 on the register whereby the process is repeated. The re-set pulser also triggers the line time base 56, forming part of the time bases 24 of FIG. 5, and ensures that the start of a scanning line is locked to the operation of the register 46. Finally the re-set pulser 55 transmits a pulse to the tens register 47 which, therefore, executes one step for every ten steps of the register 46.

The output 0 of the tens register is connected through diodes 54 to all the output leads 00 to 09. The output 1 of the tens register is connected likewise to all the output leads 10 to 19, and so on. When the negative pulse passed from circuit to circuit in the register 47 reaches 9, a pulse is applied to a re-set pulser 57 which transmits a pulse to the circuit 0 of the register to re-set it.

The effect of the circuit of FIG. 6 is thus to generate a negative pulse at each of the outputs 00, 01, 02 etc. in succession, this process repeating itself automatically.

Thus it will be understood that the input to each device 30 is by way of two diodes, one being one of the diodes 29 and the other the diode 54 in the corresponding horizontal lead of FIG. 6. These two diodes form a conventional "and" gate of the type previously described with reference to FIG. 8 and also as shown in FIG. 14 and accordingly a negative potential will only be applied to the input of the device 30 when a negative pulse is applied at both the diodes, that is, both by the switch 38 and by the clipper 33.

Difficulty may be met with owing to fluctuations in brightness of the scanning spot on the screen 23 of FIG. 5. This may be caused by non-uniformity of the phosphor. In order to reduce such fluctuations there may be provided, as shown in FIG. 5, a photo-cell 58 which receives light direct from the screen 23 and not from the paper 26. An amplifier 60 develops a bias voltage which is applied to the grid of the tube 20 in the appropriate sense.

In some cases it may be undesirable to broaden the scanning spot by simple de-focusing in order that it shall have the width of a picture element, that is to say a width approximately equal to the pitch of the lines $S_1$, $S_2$ etc. in FIG. 1. The desired effect may then be achieved by using a sharply focused spot and imparting to the spot a high frequency vibration at right angles to its direction of scanning motion. A suitable frequency is about 30 mc./s. and the spot vibration, which is known as "spot wobble" in television systems, may be obtained by means well known in connection with television receivers.

Other modes of scanning than that described may, of course, be used, such as one using a television type camera tube. Moreover, as already stated, the signals applied through the diodes 29 in FIG. 5 may be of different form from that described.

The outputs at 1, 2, 3 etc. in FIG. 5 are, in this example, in the form of a negative direct voltage; that is to say if a numeral 1 is scanned a negative voltage will be produced at the output 1 and all the other outputs will remain at zero. Of course the presence of a symbol may be identified at the outputs by any characteristic state. The outputs may be translated with the aid of further matrices or otherwise, with or without timing circuits, into serial or parallel binary or other code.

As already stated it is desirable to make use of the invention of patent application Serial No. 648,235 in order to ensure centering of the scan relatively to each symbol. However, substantial errors in centering can be dealt wtih by the use of appropriate logical elements 35 in FIG. 5 and in some cases this may be sufficient by itself. In other cases the logical elements may be designed to overcome residual errors in centering remaining after the application of the invention of application Serial No. 648,235.

The way in which logical elements can be designed to cope with centering errors will be described with reference to FIG. 13. In this figure the individual elements of a scanning matrix are numbered 101 to 181, the number of elements having been reduced to 9 x 9 for simplicity. The symbol in this case is a black cross which is shown shaded. At ($c$) the cross is properly centered; at ($a$) it is displaced upward (or north) by one element; at ($e$) it is displaced south by one element; and at ($b$)

and (*d*) it is displaced west and east respectively by one element.

Since it has been explained how logical elements can be arranged to pass a signal if and only if certain logical conditions are fulfilled, a description sufficient for one skilled in the art to construct an appropriate circuit is given by setting down the logical conditions in question.

The cross can be recognised as such when it is in any of the five positions shown in FIG. 13 by the following conditions: there is black in 114 and 123 and 130 and 131 and 132 and 133 and 134 and 141 and 150; or in 122 and 131 and 138 and 139 and 140 and 141 and 142 and 149 and 158; or in 123 and 132 and 139 and 140 and 141 and 142 and 143 and 150 and 159; or in 124 and 133 and 140 and 141 and 142 and 143 and 144 and 151 and 160; or in 132 and 141 and 148 and 149 and 150 and 151 and 152 and 159 and 168.

Combinations of the misregistrations shown in FIG. 13 may occur and nevertheless the symbol may be recognised. This is the symbol displaced north-west by one square north and one square west can be recognised by adding to the conditions above states the following: or in 113 and 122 and 129 and 130 and 131 and 132 and 133 and 140 and 149. Corresponding conditions for displacements NE, SE and SW will be readily deduced.

FIGURE 14 shows a modification of a part of FIG. 5 by which each of the storage devices 30 of FIG. 5 is replaced by a capacitor storage device. Such a device comprises, in this example, a p-n-p transistor 68 connected in grounded-collector circuit so as to have a relatively high input impedance, a relatively low output impedance across a resistor 69, and almost unity voltage gain. Diodes 70 and 71 in conjunction with a resistor 72 constitute an "and" gate. Negative pulses on the lead 37 of FIG. 5, which may be derived as described with reference to FIG. 6, are applied through the diode 70 to the base of the transistor 68 while negative-going pulses corresponding to black are applied from the photo-cell 28 and clipper 33 of FIG. 5 through the diode 71 to the base. The diodes 70 and 71 are biased to cut off by means shown as batteries 73 and 74.

When a negative pulse appears simultaneously at the two diodes 70 and 71, a pulse of say −10 volts is applied to the base of the transistor and the emitter is driven thereby to about −10 volts. A capacitor 75 is then charged through a diode 76. At the end of the pulse the capacitor 75 is left charged and this charge is retained since the diode 76 does not conduct appreciably. The voltage on the capacitor 75 is then available on the conductor 31 of the matrix in FIG. 5.

The conductor 31 is connected through a diode 78 and a resistor to a bias source 77 of sufficient voltage to prevent discharge of the capacitor 75. A positive pulse generated during the frame flyback of the time bases 24 which is controlled, as in FIG. 5 by the clock pulse generator 41, is applied from 24 through a diode 78, thus discharging the capacitor 75 which is restricted from charging in the positive direction by the diode 79. The same positive pulse is applied to all the stores in parallel so that at the end of each complete scan all the stores are reset.

The circuit of FIG. 14 is a binary storage device, since the capacitor 75 has two operating conditions, namely charged or discharged.

It will be noted that the storage devices 30 of FIG. 5 each have two outputs 31' and 32' either of which becomes negative according to the state of the storage device. In the device of FIG. 14, on the other hand, only one output lead 31' is provided, this lead assuming a potential which is negative or zero according to the state of the storage device.

The way in which forms of storage devices other than the bi-stable detvices 30 of FIG. 5 or the capacitive device of FIG. 14, for example ferrite cores, may be used will be understood by those skilled in the art.

Reference has hitherto been made to forms of the invention in which the symbols are scanned thereby generating characteristic signals whose signal elements are distributed in time. This is not essential since the signal elements may be derived and applied to the individual storage devices simultaneously.

To take a simple example, if symbols are to be recognised by the state of four parts thereof as shown in FIG. 3, a separate photo-cell may be arranged to receive light from each of the squares 1, 2, 3 and 4. Each of these cells is connected through an amplifier to a different one of four storage devices, such as those at 30 in FIG. 5.

The paper sheet 26 in FIG. 5 may be arranged to be moved in steps or continuously in such a manner as to bring symbols in succession in the proper position for scanning. If desired the movement of the sheet 26 may be in one direction only, the other component of relative movement being provided by displacing the centre of the scanning raster by means of a sawtooth voltage applied to deflect the cathode ray beam. For instance when reading symbols arranged in a series of horizontal lines, the paper 26 may be moved only in the direction perpendicular to the lines, a sawtooth voltage serving to move the centre of scan in the line direction.

We claim:

1. Apparatus for reading symbols, comprising signal generating means for deriving a plurality of signal elements from a two-dimensional array of elementary areas respectively, said areas making up an area containing a symbol being read, each signal element being representative of a property of the distribution of the symbol density within the respective elementary area, and the combination of said signal elements constituting a signal characteristic of said symbol, a plurality of binary storage devices, of number equal to the said elementary areas in said array and in one-to-one correspondence with said areas respectively, and each having an input and at least one output, means for applying said signal elements to said inputs of said corresponding storage devices respectively individually to set the states of said storage devices, a matrix comprising a co-ordinate set of input conductors and a co-ordinate set of output conductors, one output conductor for each different symbol to be read, and logical elements interconnecting said input and output conductors, and means coupling said outputs of said storage devices to said input conductors respectively.

2. Apparatus for reading symbols comprising signal generating means for deriving a plurality of signal elements from a rectangular array of elementary areas respectively, each signal element being representative of whether the average symbol density within the respective elementary area is above or below a datum level, said elementary areas together making up the area containing said symbol and the combination of said signal elements constituting a signal characteristic of said symbol being read, a plurality of binary storage devices, of number equal to the said elementary areas in said array and in one-to-one correspondence with said areas respectively, and each having an input and at least one output, means for applying said signal elements to said inputs of said corresponding storage devices respectively individually to set the states of said storage devices, a matrix comprising a co-ordinate set of input conductors and a co-ordinate set of output conductors, one output conductor for each different symbol to be read, and logical elements interconnecting said input and output conductors, and means coupling said outputs of said storage devices to said input conductors respectively.

3. Apparatus for reading symbols comprising scanning means for successively scanning the elementary areas of a rectangular array of elementary areas making up the area containing a symbol being read, to derive therefrom respective signal elements representative of whether the average symbol density within the respective elementary area is above or below a datum level, the combination of said signal elements constituting a signal characteristic of said symbol, a plurality of binary storage devices, of number equal to the said elementary areas in said array and in one-to-one correspondence with said areas respectively, and each having an input and at least one output, switching means coupling, said scanning means to said inputs of said corresponding storage devices in succession individually to apply successively derived signal elements to different ones of said inputs, a matrix comprising a co-ordinate set of input conductors and a co-ordinate set of output conductors, one output conductor for each different symbol to be read, and logical elements interconnecting said input and output conductors, and means coupling said outputs of said storage devices to said input conductors respectively.

4. Apparatus according to claim 3, wherein said scanning means comprise a cathode ray tube, means scanning the beam of said tube in a raster over the screen of the tube, means directing light from said screen upon said symbol and means positioned to receive light from said symbol.

5. Apparatus according to claim 3, wherein said switching means comprise a cascade of electronic trigger circuits, a source of clock pulses and means coupling said source to each of said trigger circuits, each said trigger circuit on application of a clock pulse assuming the state previously held by the preceding trigger circuit.

6. Apparatus according to claim 3, wherein said switching means comprise a plurality of "and" gates each having first and second inputs and an output, means coupling said scanning means to the first input of each said "and" gate, means coupling said outputs of said "and" gates to said inputs of said storage devices respectively, a source of gating pulses locked to said scanning means having a plurality of pulse outputs, and means coupling said pulse outputs to different ones of said "and" gates.

7. Apparatus according to claim 4, said cathode ray tube having beam intensity control means, comprising a photo-electric device positioned to receive light from said screen and not from said symbol, and means coupling said photo-electric device to said intensity control means to apply to said intensity control means a voltage to decrease variations in said light reaching said photo-electric device.

8. Apparatus for reading symbols comprising scanning means for successively scanning the elementary areas of a rectangular array of elementary areas making up the area containing a symbol being read, to derive therefrom respective signal elements representative of whether the average symbol density within the respective elementary area is above or below a datum level, the combination of said signal elements constituting a signal characteristic of said symbol, a plurality of binary storage devices, of number equal to the said elementary areas in said array and in one-to-one correspondence with said areas respectively and each having an input and two outputs, means for applying said signal elements to said inputs to set the states of said corresponding storage devices, the one or the other of the said two outputs of each said storage device assuming a predetermined state according as to whether the signal element applied thereto is representative of a level of average density above or below said datum level, a matrix comprising a co-ordinate set of input conductors and a co-ordinate set of output conductors, one output conductor for each different symbol to be read, and logical elements interconnecting said input and output conductors, and means coupling said outputs of said storage devices to said input conductors respectively.

References Cited in the file of this patent

UNITED STATES PATENTS

| | | |
|---|---|---|
| 2,188,679 | Dovaston | Jan. 30, 1940 |
| 2,460,471 | Schade | Feb. 1, 1949 |
| 2,604,534 | Graham | July 22, 1952 |
| 2,615,992 | Flory | Oct. 28, 1952 |
| 2,616,983 | Zworykin | Nov. 4, 1952 |
| 2,627,039 | MacWilliams | Jan. 27, 1953 |
| 2,719,247 | Bedford | Sept. 27, 1955 |
| 2,740,949 | Counihan | Apr. 3, 1956 |
| 2,801,385 | Bendell | July 30, 1957 |
| 2,817,702 | Graham | Dec. 24, 1957 |
| 2,918,653 | Relis | Dec. 22, 1959 |
| 2,933,559 | Campbell | Apr. 19, 1960 |

OTHER REFERENCES

"Character Recognition," by M. H. Glauberman, Electronics, February 1956, pp. 132 to 136.